June 3, 1952 — W. M. BROOKS — 2,599,318
SHACKLE SEAL
Filed Oct. 5, 1948 — 2 SHEETS—SHEET 1
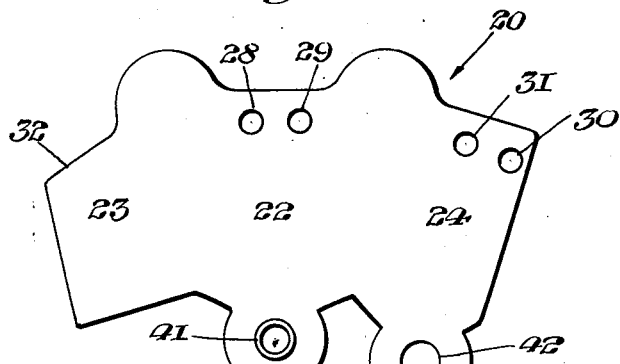
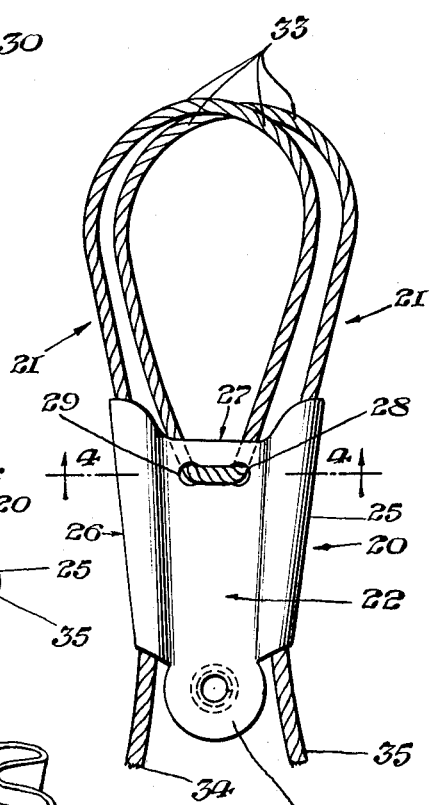
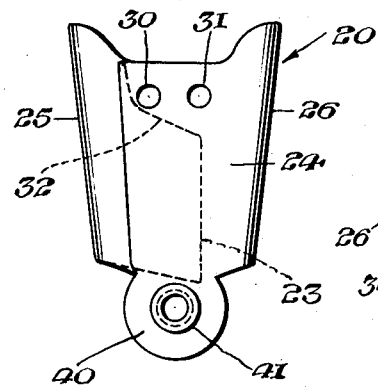
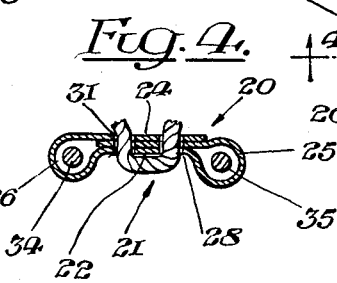
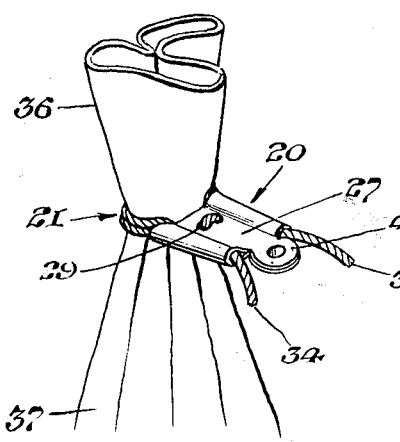
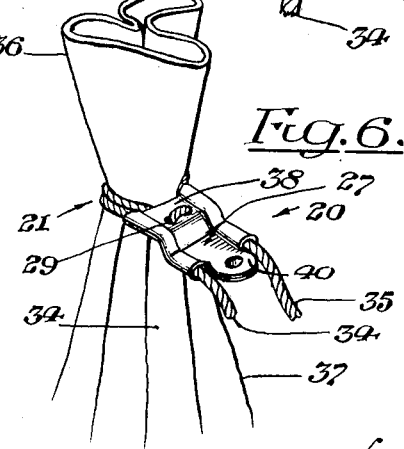
Inventor
Winfred M. Brooks
by his Attorney June 3, 1952  W. M. BROOKS  2,599,318
SHACKLE SEAL
Filed Oct. 5, 1948  2 SHEETS—SHEET 2
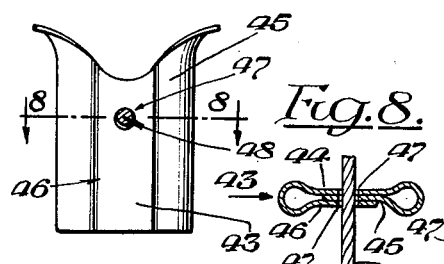
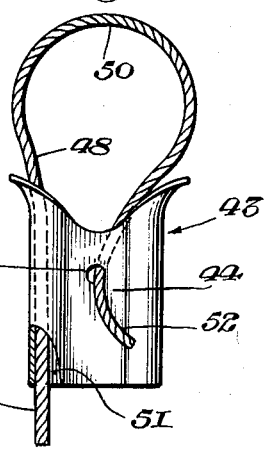
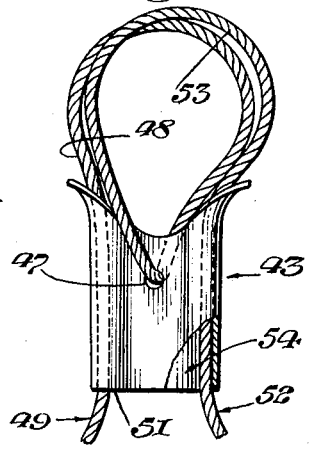
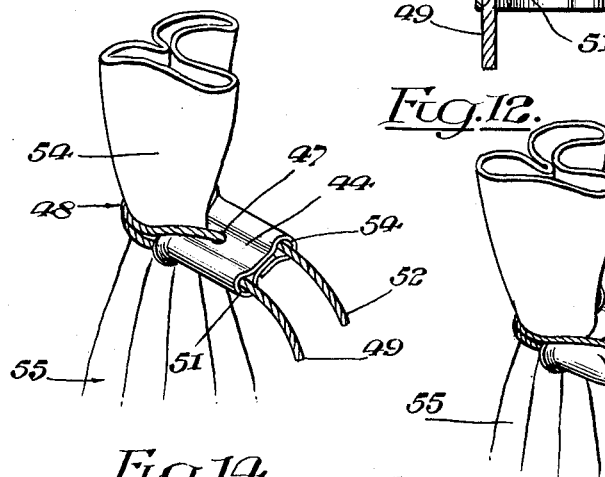
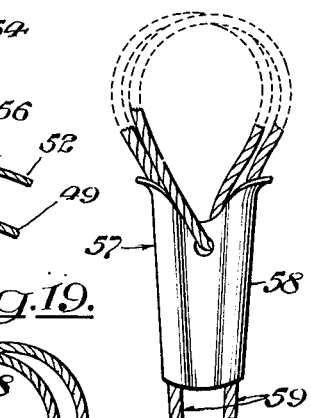
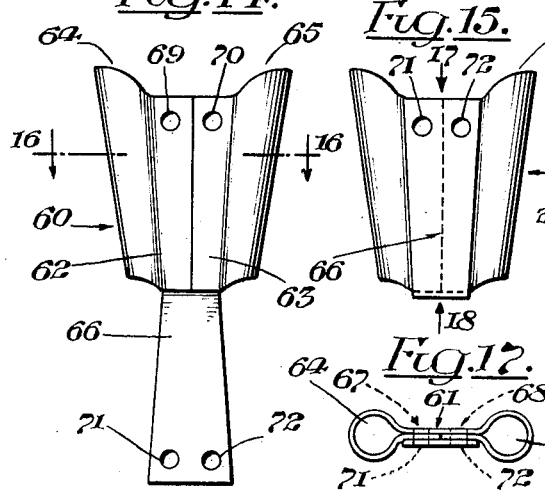
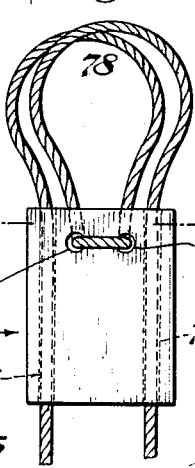
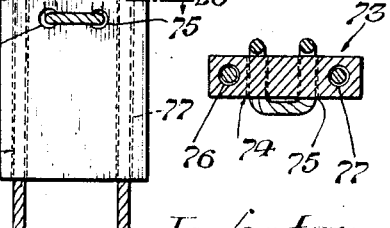
Inventor:
Winfred M. Brooks
by his Attorney Patented June 3, 1952

2,599,318

UNITED STATES PATENT OFFICE 2,599,318

SHACKLE SEAL

Winfred M. Brooks, West Orange, N. J., assignor to E. J. Brooks Company, Newark, N. J., a corporation of New Jersey Application October 5, 1948, Serial No. 52,833

4 Claims. (Cl. 292—310)

This invention relates generally to shackle seals, and more particularly, though not exclusively, shackle seals of the type used in connection with money bags for transporting specie.

It has been the practice for many years, in the prior art to which the invention relates, to thread and rethread each end of the shackle longitudinally through a sealing element to provide two loops which are to be tightened around the flexible mouth of a bag, after which the sealing element is deformed, as by crimping or compressing, to prevent the loops from being loosened and from unauthorized access being had to the contents of the bag. The shackle, which is usually of fibrous material, thus has to be laboriously threaded four times through the relatively great longitude of a sealing element. This is a time-consuming operation and involves a waste of material in the length of shackle required, as the seals are made by the million. The disadvantages of the system now used have long been understood, and it is an object of this invention to remedy this condition.

The sealing element usually employed in the past has been a body of lead but, as lead is sometimes scarce, attempts have been made to use a sealing element of sheet-material. In my Patent No. 2,342,244, such a sheet-material sealing element is disclosed, said sealing element consisting of a flat sleeve, open at both ends and provided at one end with a bridge portion against which the flexible shackle is tightened. The sealing element of said Patent No. 2,342,244 has been successfully used in large quantities but it has this disadvantage, that it requires a very deep drawing operation, so much so that, to prevent overheating, the drawing operation has to be performed in three steps, which slows up the operation of producing the sealing element and renders it relatively expensive. It will be observed that, in said Patent No. 2,342,244, each end of the shackle of flexible material is threaded and rethreaded lengthwise through the sealing element to produce the double loop. Accordingly, another object of the instant invention is to produce a shackle seal in which the sealing element can be made of sheet-material without necessitating the use of a deep drawing operation.

Stated generally, one feature of the invention consists in having a shackle of flexible material lying threaded transversely through the smaller dimension of a deformable sealing element near one longitudinal end of the latter, such shackle lying in double loop formation adjacent the end where it is threaded transversely through said sealing element, and both free ends of said shackle lying extended lengthwise in the same direction through said sealing element.

Stated generally, another feature of the invention resides in a deformable laminated sealing element which has one or two transverse passages through its laminations and two longitudinal channels between laminations, together with a shackle of flexible material that lies threaded through said transverse passage or passages and lies threaded through said channels to thereby oppose separation of said laminations and to prevent withdrawal of said shackle from said sealing element after the latter has been deformed.

Other features of invention will appear as the specification proceeds.

In the accompanying drawings:

Figs. 1 to 6 inclusive show one preferred form of the invention.

Fig. 1 is a plan view of the blank of the sealing element before the sections thereof are folded over one another;

Fig. 2 is a view in elevation of the sealing element showing the sections thereof folded over one another, but before the shackle is threaded therethrough;

Fig. 3 is a view in elevation of the sealing element showing the shackle threaded therethrough; the face of the seal shown in this view is the opposite of that shown in Fig. 2;

Fig. 4 is a sectional view substantially on the plane of line 4—4 of Fig. 3;

Fig. 5 shows the shackle seal tightened around the mouth of a bag, but before the sealing element is deformed;

Fig. 6 is like Fig. 5 but shows the sealing element deformed;

Figs. 7 to 12 show a second preferred form of the invention;

Fig. 7 is a view of the sealing element in elevation and with the shackle shown in section;

Fig. 8 is a sectional view substantially on the plane of line 8—8 of Fig. 7;

Fig. 9 is a view similar to Fig. 7 but shows the shackle threaded through the transverse passage and one free end thereof through one of the longitudinal channels;

Fig. 10 is a view similar to Fig. 9 but shows the other free end of the shackle threaded through the other longitudinal channel;

Fig. 11 is a perspective view showing the loops of the shackle tightened around the mouth of a bag;

Fig. 12 is a view similar to Fig. 11 but shows the sealing element deformed;

Fig. 13 is a view similar to Fig. 10 but shows a slightly modified form of the sealing element;

Figs. 14 to 18 show a third preferred form of the invention;

Fig. 14 is a plan view showing the side wing sections folded over the backing section but before the bottom section has been folded over the wing sections;

Fig. 15 is a view similar to Fig. 14 but shows the bottom section folded over the wing sections;

Fig. 16 is a sectional view substantially on the plane of line 16—16 of Fig. 14;

Fig. 17 is a top view looking in the direction of arrow 17 of Fig. 15;

Fig. 18 is a bottom view looking in the direction of arrow 18 of Fig. 15;

Figs. 19 and 20 show a fourth preferred embodiment of the invention;

Fig. 19 is a view similar to Figs. 3 and 10 but shows the shackle threaded through a sealing element of lead; and Fig. 20 is a sectional view substantially on the plane of line 20—20 of Fig. 19.

Referring to that form of the invention shown in Figs. 1 to 6 inclusive, 20 indicates the sealing element, and 21 the shackle of flexible material. Sealing element 20 is here composed of sheet-material, the sections of which are folded over one another in overlying relation to produce a laminated structure. Specifically, 22 indicates a backing section, and 23 and 24 two side wings that are folded inwardly over the backing section to form, at the lines of bending, two longitudinal channels 25 and 26 between the laminations of the sealing element, said channels being open at both ends. It will be seen that the laminations constitute a main central portion 27 intermediate channels 25 and 26.

Near one end, longitudinally, of sealing element 20 is provided one or two transverse passages through its laminations. In the form shown here, there are two closely adjacent passages that are provided by openings 28 and 29 in backing section 22, and two corresponding openings 30 and 31 in wing section 24. When the sections are folded over one another, the openings in wing 24 are brought into alinement with the openings in backing section 22. Wing 23, which lies folded between 22 and 24, may be provided with corresponding openings but, in the present instance, said wing 23 is cut away as at 32, thereby rendering it unnecessary to provide separate openings in wing 23.

Opposite ends of shackle 21 are threaded through the transverse passages, and said shackle is then placed in double loop formation 33 adjacent that end longitudinally of the sealing element, or that zone 38 where the transverse passage or passages are located. One free end 34 of the shackle is then threaded through longitudinal channel 26 and the other free end 35 of said shackle is threaded, in the same direction longitudinally, through longitudinal channel 25. Double loop 33 is placed around mouth 36 of coin bag 37, after which the loops are drawn taut (Fig. 5), and the sealing element is then deformed (Fig. 6) but only outside zone 38 where the transverse passages are located so as not to sever the transversely threaded portion of the shackle.

It will be seen from Fig. 4 that the transverse dimension of the sealing element is, with respect to the latter's longitudinal dimension as shown in Fig. 3, smaller. Thus the troublesome task of four longitudinal threadings is avoided and the length of the shackle can be diminished. As previously pointed out, the seals are made by the million and the saving in time and material is therefore considerable. The transverse passage or passages should be as near one end longitudinally of the sealing element as possible, not only to avoid severance of the shackle in the zone where it is threaded transversely through the sealing element, but also to make the sealing element, after the shackle has been tightened, stand outwardly away from the mouth of the coin bag, so that the tool for deforming said sealing element can be readily applied.

It will further be seen that threading the shackle transversely through the sealing element tends to oppose separation of the laminations thereof, and that threading the shackle through the longitudinal channels will, after the sealing element has been deformed, prevent withdrawal of the shackle from the sealing element. As stated, threading the shackle transversely opposes separation of the laminations. If desired, however, means other than the shackle can also be used to additionally oppose separation of said laminations. Such means may take many forms but, as shown here, backing section 22 and outermost wing 24 can be provided with tail sections 39 and 40, tail section 39 being provided with an upstanding riveting element 41 that will extend through eye 42 of tail section 40 when the sections are folded together, after which said riveting element is flattened by riveting it over the edges of opening 42.

Referring to the modification of the invention shown is Figs. 7 to 12 inclusive, sealing element 43 is composed of sheet-material and consists of a backing member 44 and two side wings 45 and 46, that are folded into overlying relation. In this instance, there is but a single transverse opening 47, the several laminations of the sealing element having coincidental openings when brought into overlying relationship.

Shackle 48 of flexible material is threaded through passage 47, after which free end 49 is laid into a loop 50 and threaded through longitudinal channel 51 (Fig. 9). The outer free end 52 of the shackle is laid into a loop 53 and is then threaded through longitudinal channel 54 (Fig. 10). Loops 50 and 53 are passed around mouth 54 of coin bag 55 and tightened (Fig. 11), and thereafter the sealing element is deformed (Fig. 12) outside the zone 56 where the shackle is exposed.

In Fig. 13 a slight modification of the sealing element is disclosed, in that longitudinal channels 57 and 58, instead of being parallel, are converging so as to bring the free ends 59 of the shackle close together for the purpose of facilitating the pulling action in tightening the loops around the coin bag.

In Figs. 14 to 18 inclusive is shown another modified form of sealing element. As before, sheet-material sealing element 60 consists of a backing section 61 and two side wing sections 62 and 63, which latter are folded inwardly toward each other to provide longitudinal channels 64 and 65. In this instance, side wings 62 and 63 overlie backing section 61 but do not overlap. 66 indicates a bottom section forming part of the backing section, and which, after side wings 62 and 63 have been folded inwardly, is bent upwardly to cover the infolded side wings. Backing section 61 is provided with two openings 67 and 68, each wing section 62 and 63 has an opening 69 or 70 and bottom section 66 has two openings 71 and 72. When the sections are folded together, the several openings will be brought into register to form two transverse passages through the laminations of the sealing element. The shackle (not shown) is threaded through the sealing element as described in connection with Figs. 1 to 6 inclusive, and the subsequent steps of tightening the loops and deforming the sealing element are also as previously described.

In Figs. 19 and 20, sealing element 73 is a body of lead, the transverse dimension of which is, with respect to its longitudinal dimension, smaller. Near one end longitudinally of sealing element 73 are, in this instance, two transverse passages 74 and 75 closely adjacent to each other. 76 and 77 indicate two longitudinal channels. Shackle 78 is threaded first through the transverse passage or passages and then through the longitudinal channels as described in connection with Figs. 1 to 6 inclusive, and the subsequent steps of tightening the loops and deforming the sealing element are also as previously described.

I claim:

1. In a shackle seal: the combination of a deformable sealing element, whose transverse dimension is, with respect to its longitudinal dimension, relatively smaller, said sealing element having two longitudinal interior channels open at both ends and having near one of its longitudinal ends and intermediate said channels one or two transverse passages; and a shackle of flexible material lying freely threaded through said transverse passage or passages and lying in double loop formation adjacent thereto, one end of said shackle lying threaded through one of said interior channels and the other end of said shackle lying threaded through the other of said interior channels in the same direction longitudinally as said first-mentioned shackle end.

2. In a shackle seal: the combination of a deformable laminated sealing element composed of a plurality of folded overlying sections of sheet-material, said sealing element having one or two passages transversely through its laminations and two longitudinal channels between laminations; and a shackle of flexible material lying threaded through said passage or passages to oppose separation of the laminations, and lying threaded through said channels to prevent withdrawal of the shackle from said sealing element after the latter has been deformed.

3. In a shackle seal: the combination of a sheet-material sealing element composed of a backing section and two side wings, said side wings lying inwardly folded to provide two longitudinal interior channels, open at both ends, adjacent the bending lines of said backing section and side wings, said backing section and side wings constituting a main central portion, intermediate said interior channels, consisting of several layers of sheet-material two or more of which are provided with one or more transverse openings; and a shackle of flexible material extending through said transverse openings and lying in double loop formation adjacent thereto, one end of said shackle lying threaded through one of said interior channels and the other end of said shackle lying threaded through the other of said interior channels in the same longitudinal direction as said first-mentioned shackle end.

4. In a shackle seal: the combination of a sheet-material sealing element composed of a backing section, two side wings and a bottom section, said side wings lying inwardly folded to provide two longitudinal interior channels, open at both ends, adjacent the bending lines of said backing section and side wings, said bottom section lying folded over the side wings, said backing section, side wings and bottom section constituting a main central portion, intermediate said interior channels, consisting of several layers of sheet-material, said backing section having two transverse openings, each of said wing sections having one transverse opening, and said bottom section having two transverse openings, the openings in said sections being in alinement to receive a shackle when the wings have been inwardly folded and the bottom section has been folded over the side wings; of a shackle of flexible material extending through said transverse openings and lying in double loop formation adjacent thereto, one end of said shackle lying threaded through one of said interior channels and the other end of said shackle lying threaded through the other of said interior channels in the same longitudinal direction as said first-mentioned shackle end.

WINFRED M. BROOKS.

REFERENCES CITED

The following references are of record in the file of this patent:

UNITED STATES PATENTS

| Number | Name | Date |
|---|---|---|
| 1,068,029 | Weyrich | July 22, 1913 |
| 1,991,917 | Bates | Feb. 19, 1935 |
| 2,163,660 | Brooks | June 27, 1939 |